(12) United States Patent
Ramsey et al.

(10) Patent No.: US 9,009,920 B1
(45) Date of Patent: Apr. 21, 2015

(54) MOTORIZED EXTENSION POLE

(71) Applicants: Mark J. Ramsey, Omaha, NE (US); Mark C. Ramsey, Omaha, NE (US)

(72) Inventors: Mark J. Ramsey, Omaha, NE (US); Mark C. Ramsey, Omaha, NE (US)

( * ) Notice: Subject to any disclaimer, the term of this patent is extended or adjusted under 35 U.S.C. 154(b) by 0 days.

(21) Appl. No.: 14/269,382

(22) Filed: May 5, 2014

Related U.S. Application Data

(63) Continuation-in-part of application No. 13/564,833, filed on Aug. 12, 2012, now Pat. No. 8,882,166.

(51) Int. Cl.
| | |
|---|---|
| B25G 1/04 | (2006.01) |
| E04D 13/076 | (2006.01) |
| B05C 17/02 | (2006.01) |
| B27B 17/00 | (2006.01) |
| A01G 3/047 | (2006.01) |

(52) U.S. Cl.
CPC .............. *B25G 1/04* (2013.01); *E04D 13/0765* (2013.01); *B05C 17/0245* (2013.01); *B27B 17/00* (2013.01); *A01G 3/0475* (2013.01)

(58) Field of Classification Search
USPC ........... 16/429, 427, 422, 405, 436; 81/177.1, 81/177.2, 489; 15/143.1, 144.1, 144.4, 15/145, 159.1, 235.8, 236.3; 294/57, 19.1, 294/19.2, 19.3, 210, 209; 403/107, 109.1, 403/109.4, 377, 321
See application file for complete search history.

(56) References Cited

U.S. PATENT DOCUMENTS

| | | | |
|---|---|---|---|
| 2,423,319 A * | 7/1947 | Hunt ................................. 43/24 |
| 2,668,386 A * | 2/1954 | Benner, Jr. ......................... 43/12 |
| 2,733,885 A * | 2/1956 | Brown ........................... 248/161 |
| 3,076,263 A * | 2/1963 | Musto .............................. 30/317 |
| 3,213,574 A * | 10/1965 | Melbye et al. .................. 52/121 |
| 4,062,156 A * | 12/1977 | Roth ............................... 52/111 |
| 4,151,534 A * | 4/1979 | Bond ............................. 343/883 |
| 4,505,040 A * | 3/1985 | Everts .......................... 30/296.1 |
| 4,793,197 A * | 12/1988 | Petrovsky .................... 74/89.35 |
| 4,911,039 A | 3/1990 | Lubbock et al. |
| 5,324,086 A * | 6/1994 | Hammer ....................... 294/210 |
| 5,493,758 A | 2/1996 | Carmien |
| 5,502,864 A * | 4/1996 | Sorenson ................... 15/230.11 |
| 6,378,922 B1 | 4/2002 | Troudt |
| 6,588,065 B1 * | 7/2003 | Tucker, III ...................... 16/429 |
| 6,671,930 B2 * | 1/2004 | Lanz ............................... 16/429 |
| 7,014,546 B1 | 3/2006 | Birk |
| D519,820 S | 5/2006 | Newman et al. |
| 7,677,476 B2 | 3/2010 | Burdsall et al. |
| 7,721,391 B2 * | 5/2010 | Bukovitz et al. ................ 16/429 |
| 7,913,345 B2 | 3/2011 | Dayton et al. |
| 8,024,995 B2 | 9/2011 | Dayton et al. |
| 2005/0050663 A1 * | 3/2005 | Goulet ......................... 15/144.4 |
| 2011/0072601 A1 * | 3/2011 | Serio et al. .................... 15/143.1 |
| 2014/0033549 A1 | 2/2014 | Ramsey |

* cited by examiner

*Primary Examiner* — Chuck Mah
(74) *Attorney, Agent, or Firm* — Dennis L. Thomte; Thomte Patent Law Firm LLC

(57) ABSTRACT

A motorized extension pole including a first hollow pole member having a second pole member telescopically mounted in said first pole member. The second pole member is selectively moved between extended and retracted positions with respect to said first pole member by a battery powered drive motor. The drive motor is mounted within a handle attached to the inner end of the first pole member. A coupling mechanism interconnects the handle to the first pole member which permits the first pole member to be selectively rotated without rotating the handle so that the control switch on the handle is always located in a convenient position. The pole also includes limit switches for controlling the retraction and extension of the second pole member.

12 Claims, 9 Drawing Sheets

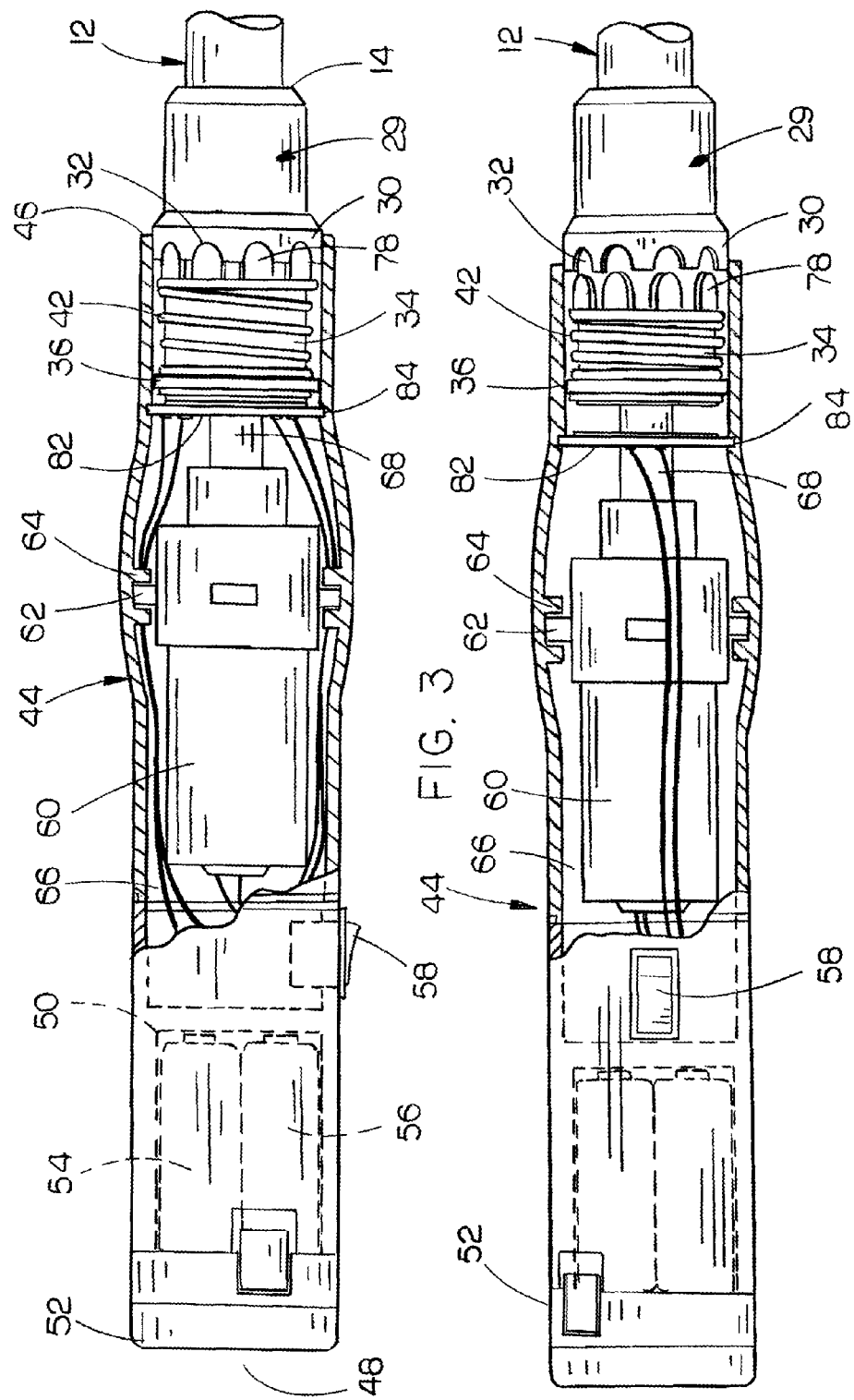

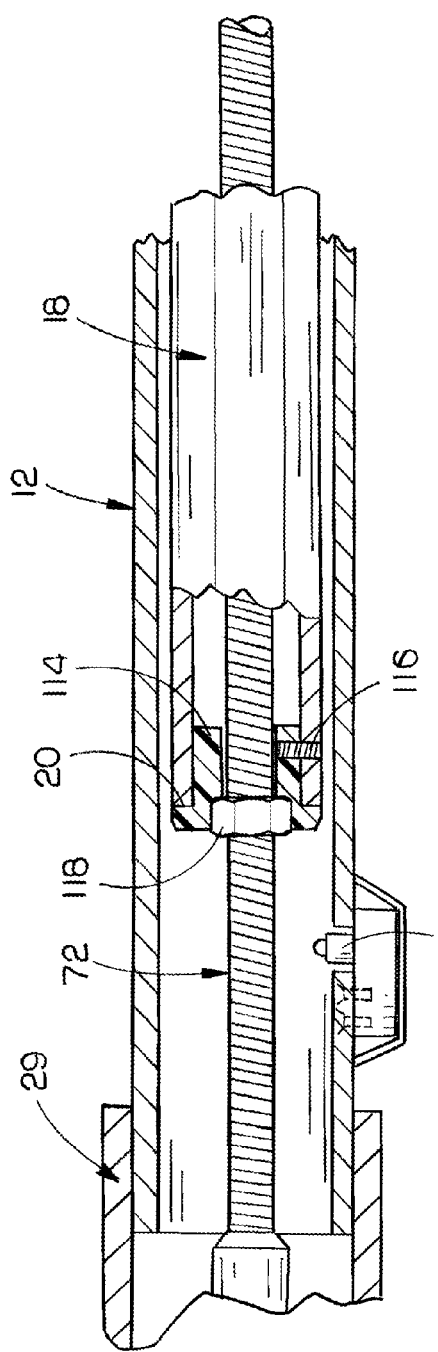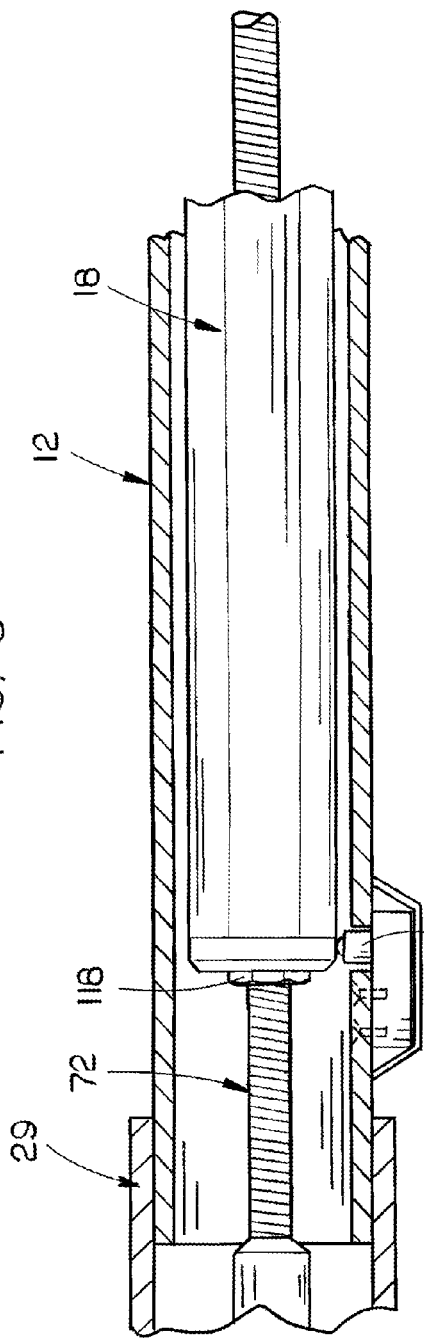

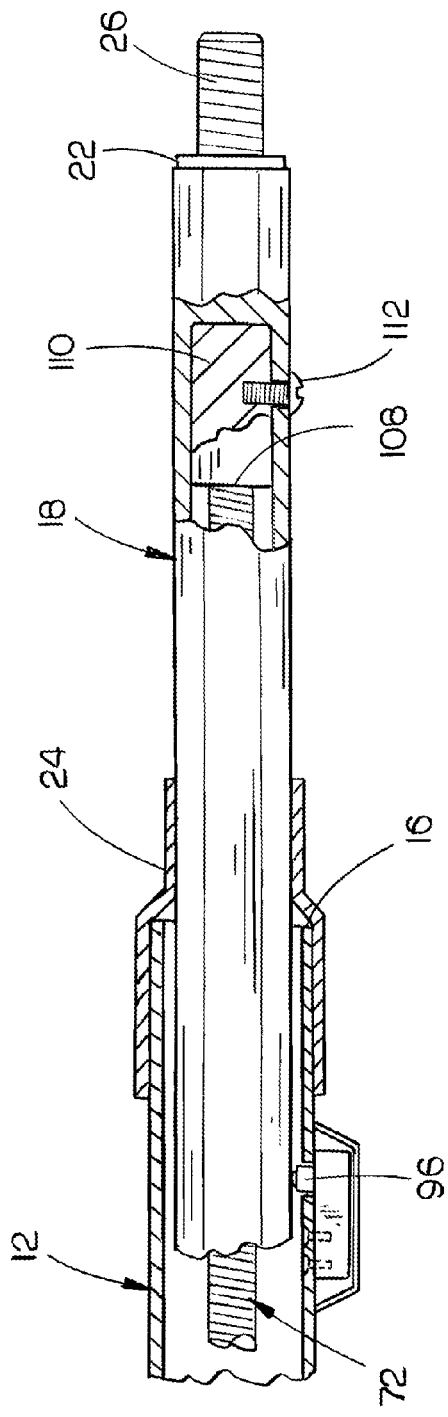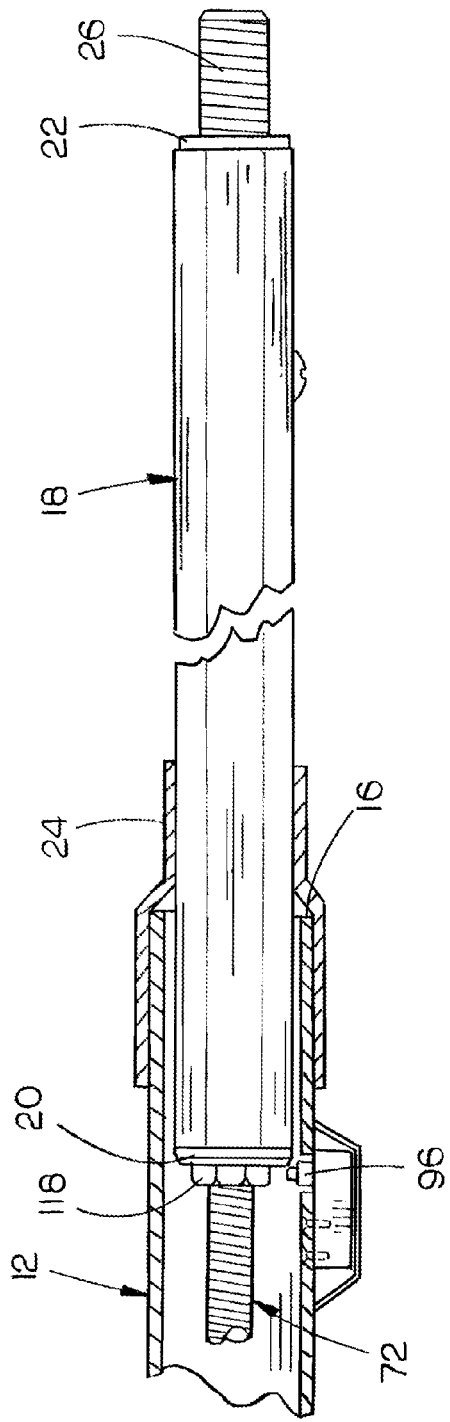

MOTORIZED EXTENSION POLE

CROSS REFERENCE TO RELATED APPLICATION

This is a Continuation-In-Part of application Ser. No. 13/564,833, filed Aug. 2, 2012, entitled MOTORIZED EXTENSION POLE.

BACKGROUND OF THE INVENTION

1. Field of the Invention

This invention relates to a length-adjustable extension pole and more particularly to a length-adjustable extension pole including a battery powered, variable speed, reversible motor which extends and retracts the inner pole member with respect to the outer pole member of the extension pole. Even more particularly, this invention relates to a length-adjustable extension pole wherein the inner and outer pole members may be selectively rotated with respect to the handle of the pole so that the control switch on the handle is always in a convenient location.

2. Description of the Related Art

Extension poles have been available for many years to enable a person to clean windows which are located above the person's normal reach. Extension poles are also used to paint areas of buildings which are located above the person's normal reach. Extension poles may also be used to string lights and ornaments on trees during the holiday season.

Most extension poles include an elongated outer pole member, having first and second ends, which telescopically receives an elongated inner pole member having first and second ends. The inner pole member is longitudinally adjustable with respect to the outer pole member and is usually held in place by a threaded collet at the second end of the outer pole member to clamp the pole members together.

When it is necessary to adjust the length of the extension pole, the collet is loosened to permit the inner pole member to be slidably adjusted with respect to the outer pole member. When the adjustment has been made, the collet is again tightened. The adjustment process described above may be awkward since the extension pole must be lowered to enable the person using the pole to loosen the collet, adjust the length of the pole, and then tighten the collet. The adjustment is made even more inconvenient since there will be a paint roller, window cleaning attachment, chain saw, hedge trimmer, gutter cleaner or other object secured to the upper end of the inner pole member.

The extension pole of the co-pending application identified above represents a significant advance in the art. However, it has been found that if the extension pole must be rotated so that the object on the outer end is in a desired attitude, the switch on the handle is sometimes inconveniently positioned since the handle rotates with the pole members.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A motorized extension pole is provided which includes a first elongated, hollow pole member having first and second ends. A second elongated hollow pole member, having first and second ends, is telescopically mounted in the first pole member. The second end of the second pole member protrudes from the second end of the first pole member. The second pole member is telescopically movable between retracted and extended positions with respect to the first pole member.

A battery powered, variable speed drive motor is secured to the first end of the first pole member with the drive motor being selectively reversible. The drive motor includes a rotatable driven member. An elongated externally threaded screw or bolt member, having first and second ends, has its first end thereof coupled to the driven member for rotation therewith in a first direction and a second direction opposite to the first direction. The screw member is threadably coupled to the second pole member whereby rotation of the screw member in the first direction by the drive motor causes the second pole member to move from its retracted position towards its extended position. The rotation of the screw member in the second direction by the drive motor causes the second pole member to move from its extended position towards its retracted position.

In the preferred embodiment, the extension pole of this invention includes structure which prevents the second pole member from rotating, with respect to the first pole member, as it moves between its retracted and extended positions and which prevents the second pole member from rotating with respect to the first pole member, as it moves between its extended and retracted positions.

In the instant invention, an indexing means is provided which enables the pole members to be rotated without rotating the handle so that the switch on the handle remains in a conventional position for actuation by the user.

It is therefore a principal object of the invention to provide an improved extension pole.

A further object of the invention is to provide a motorized extension pole.

A further object of the invention is to provide an extension pole wherein the inner pole member of the extension pole is telescopically moved with respect to the outer pole member by means of a battery powered motor.

A further object of the invention is to provide an extension pole wherein the pole members may be rotated with respect to the handle of the pole so that the switch on the handle remains in a convenient position.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 is a perspective view illustrating the extension pole of this invention being utilized to roll paint onto a wall or the like;

FIG. 3 is a partial sectional view of the handle portion of the extension pole of this invention with the indexing means being in its locked position;

FIG. 4 is a partial sectional view similar to FIG. 3 except that the indexing means has been separated to enable the pole members to be rotated with respect to the handle of the pole;

FIG. 8 is a sectional view of the invention illustrating the lower limit switch in its normal open position;

FIG. 9 is a view similar to FIG. 8 except that the lower limit switch has been closed by the lower end of the lower pole member;

FIG. 10 is a sectional view illustrating the upper limit switch in its closed position;

FIG. 11 is a view similar to FIG. 10 except that the upper limit switch has been opened.

DESCRIPTION OF THE PREFERRED EMBODIMENT

Figure 1:
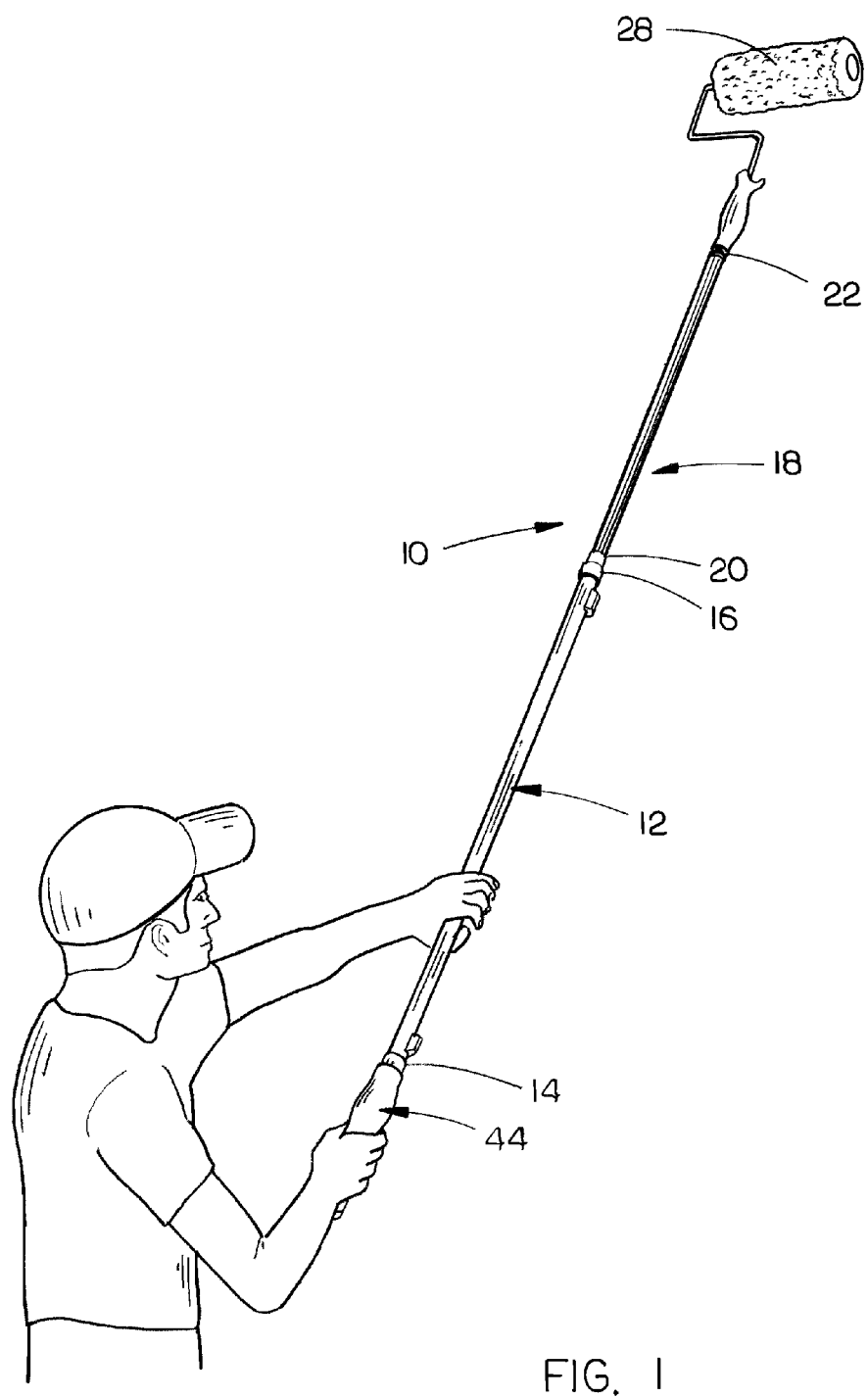
Figure 2:
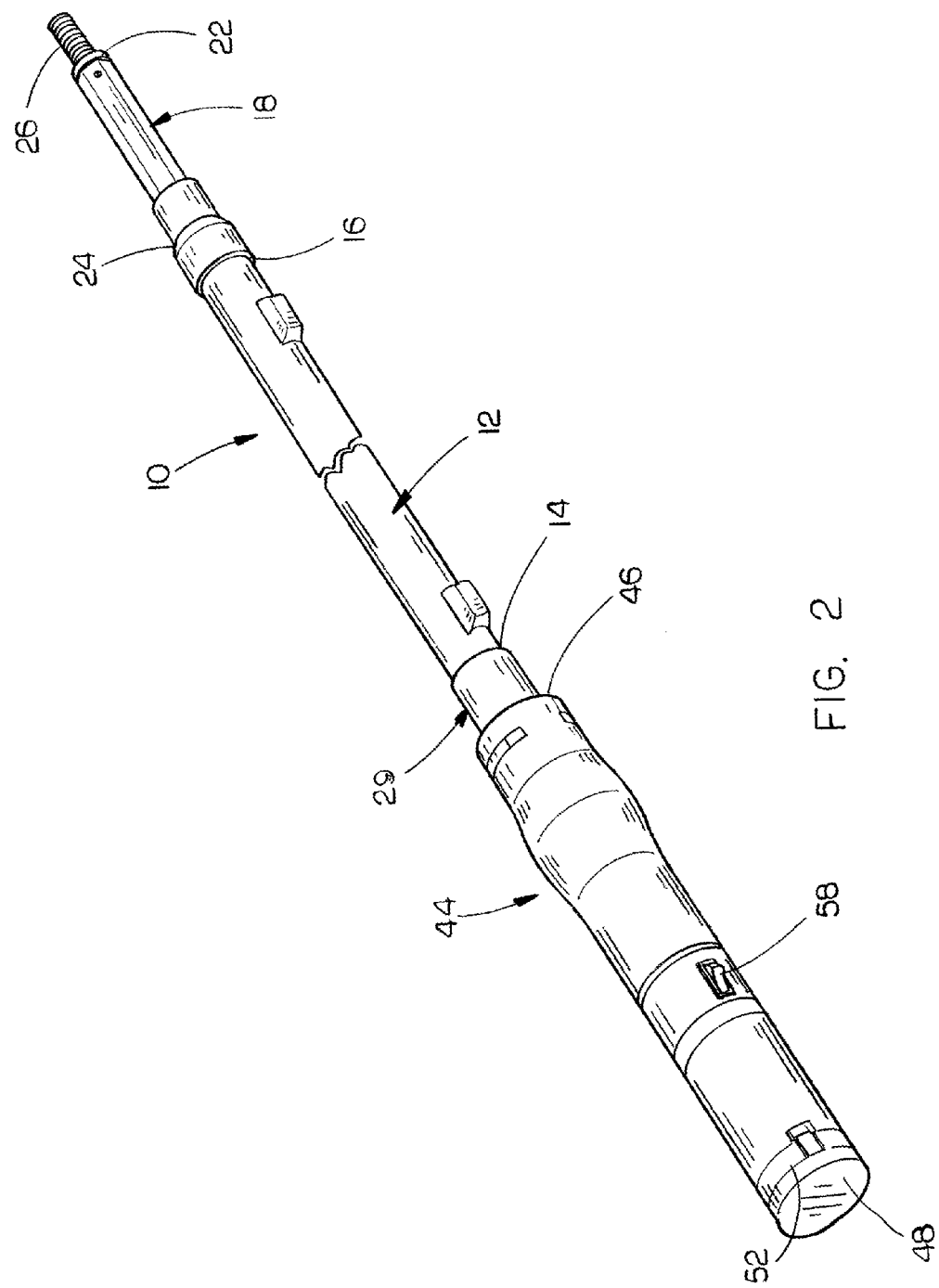
FIG. 2 is a partial perspective view of the extension pole of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The motorized extension pole of this invention is referred to by the reference numeral 10. Extension pole 10 includes an elongated hollow outer pole member 12 having a first end 14 and a second end 16. An elongated inner pole member 18, having a first end 20 and a second end 22, is telescopically slidably received within pole member 12. Pole member 18 may have a hexagonal, octagonal or a cylindrical cross-section. If the pole member 18 has a hexagonal or octagonal cross-section as seen in the drawings, a fitting 24 is mounted on the end 16 of pole member 12 to prevent rotation of pole member 18 with respect to pole member 12. In the conventional extension pole, some means is provided to retain the pole member 18 in its various longitudinal positions with respect to pole member 12. If pole member 18 has a cylindrical cross-section, a conventional collet will be mounted on the second end of the pole member 12 to clamp pole member 18 in its various selective positions with respect to pole member 12 in conventional fashion. In the instant invention, there is no need to provide such a collet or other structure to clamp the pole member 12 to the pole member 18.

Regardless of whether the pole member 18 has a hexagonal, octagonal or cylindrical cross-section, the second end of the pole member 18 will have a threaded stud 26 at the outer end thereof to which objects such as a paint roller 28 may be attached. A chain saw, hedge trimmer, window cleaner or gutter cleaner could also be attached to the threaded stud 26.

The inner end 14 of pole member 12 has a hollow hub 29 secured thereto which has a ring-shaped portion 30 having a plurality of generally U-shaped notches 32 formed therein. Hub 29 also includes an annular recessed portion 34. The inner end of hub 29 has a flange 36 provided thereon. An electrical collector ring 38 is secured to the inner side of flange 36 by screws 40. A helical spring 42 embraces recessed portion 34 of hub 28 between flange 36 and the ring-shaped portion 30.

Figure 5:
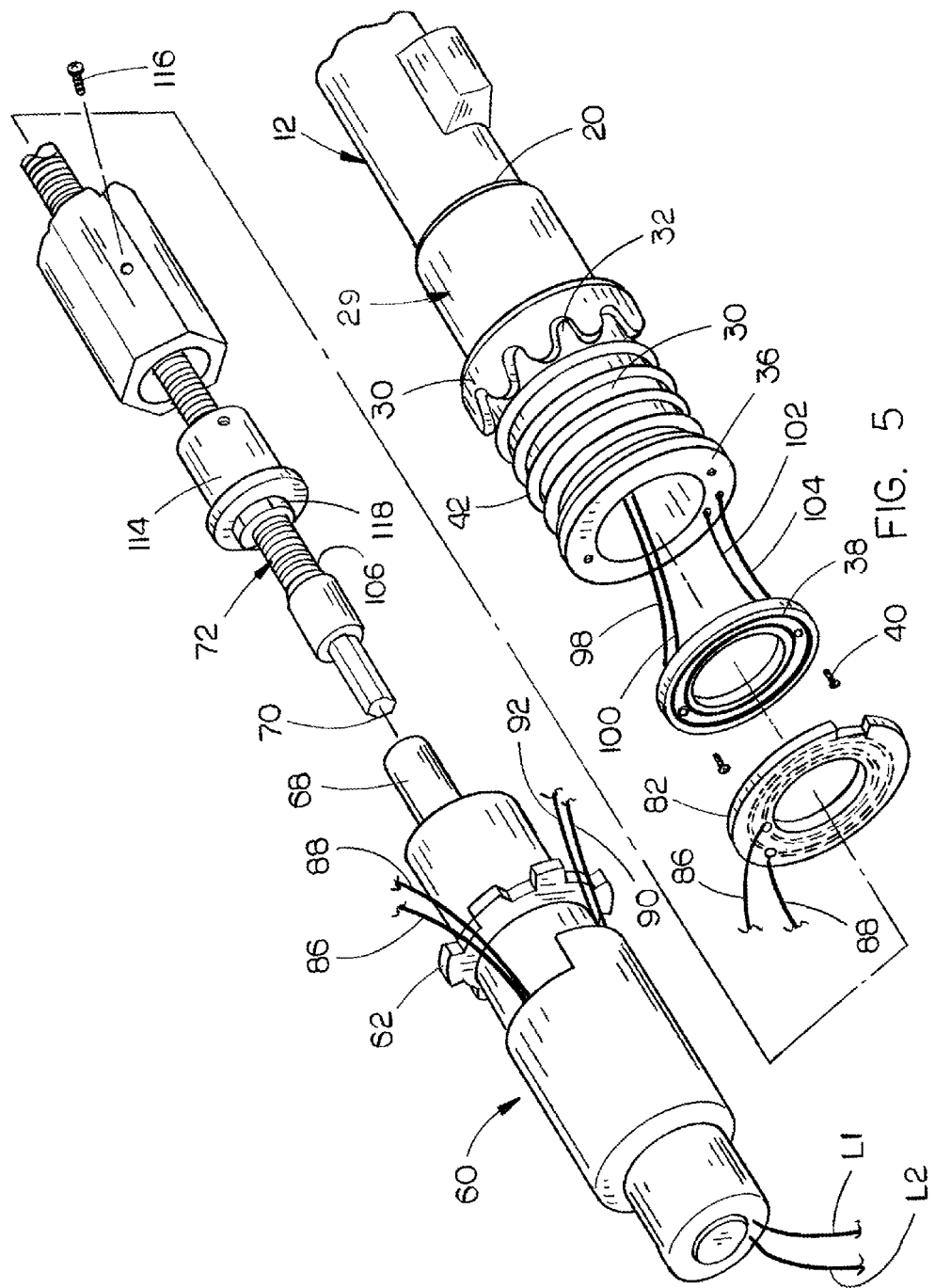
FIG. 5 is a partial exploded perspective view of the extension pole of this invention.
Figure 6:
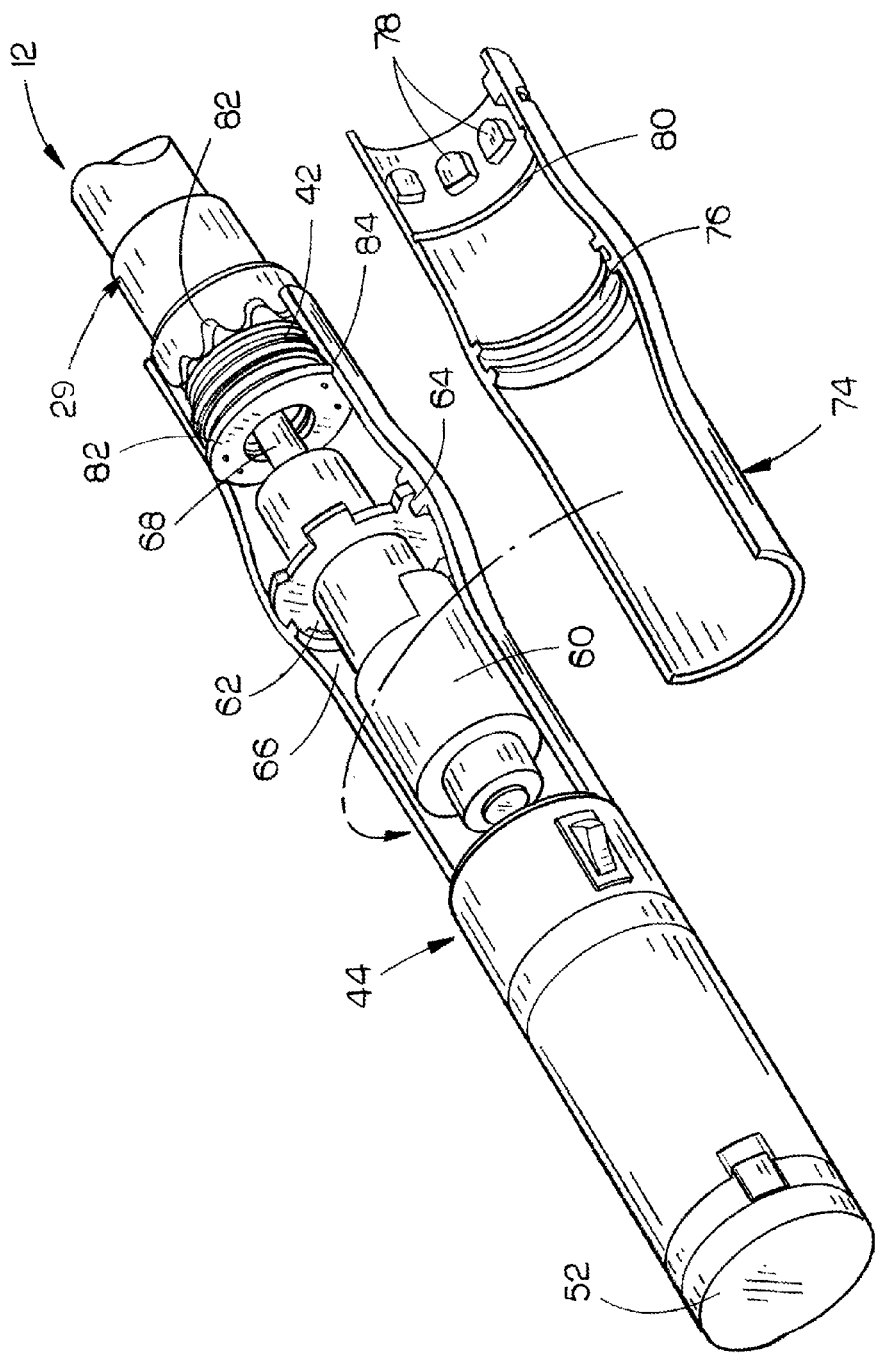
FIG. 6 is a partial perspective view illustrating the cover of the handle being removed to expose the components within the handle.
Figure 7:
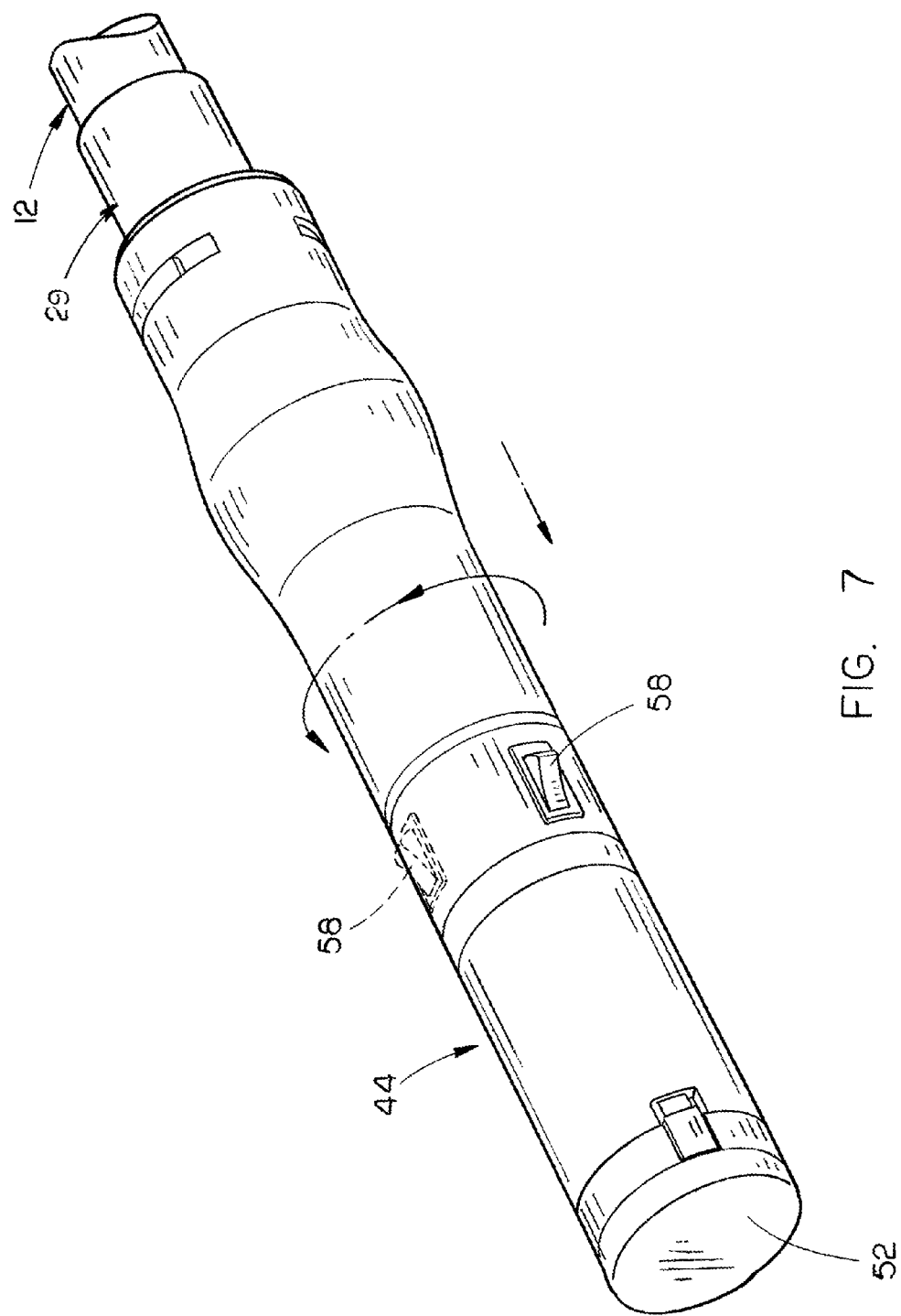
FIG. 7 is a perspective view illustrating the manner in which the handle may be rotated with respect to the pole members of the pole of this invention or vice versa.
Figure 12:
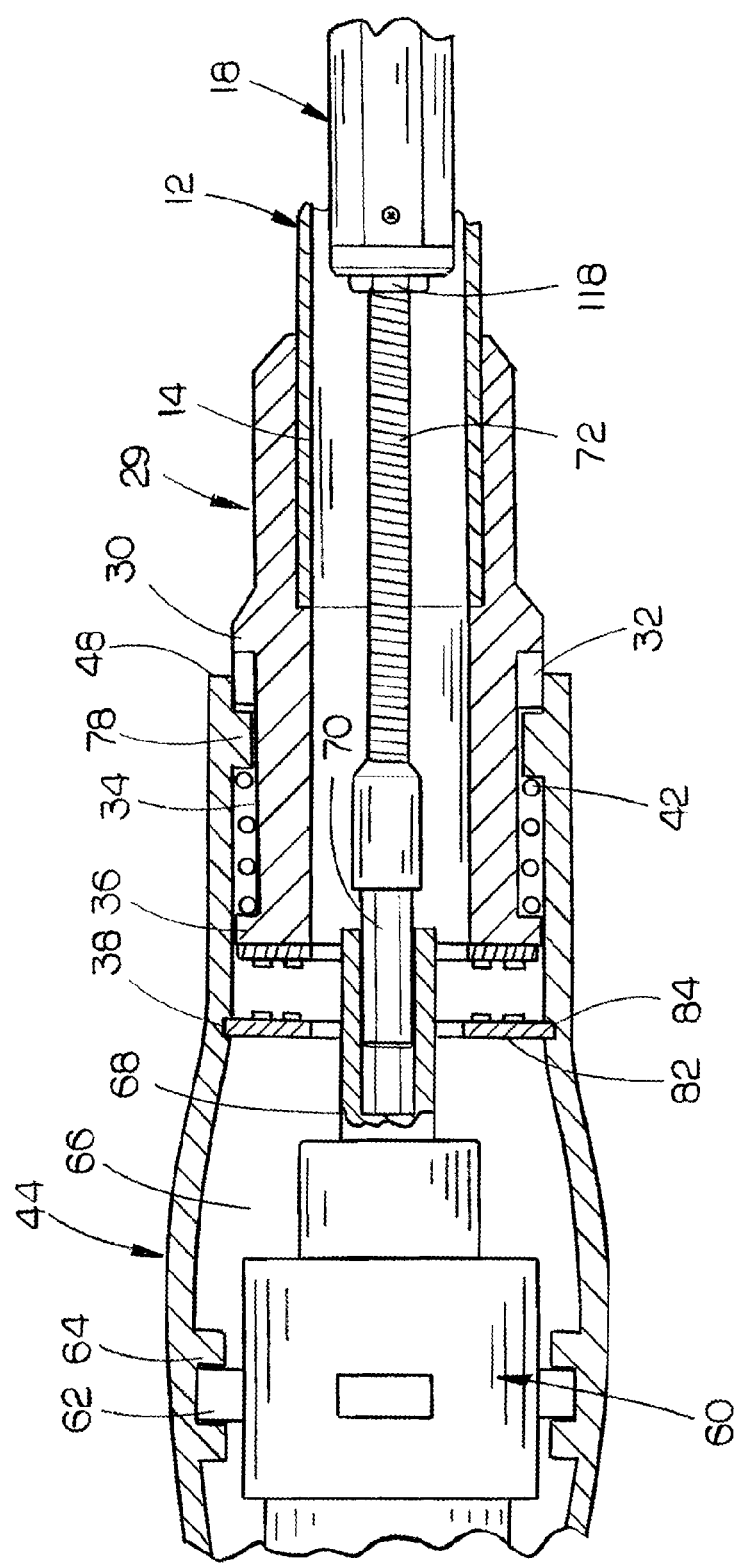
FIG. 12 is a sectional view of the handle of this invention and associated structure.

The numeral 44 refers to a generally cylindrical handle having an inner end 46 and an outer end 48. Handle 44 has a battery compartment 50 formed therein at its inner end 46 which is selectively closed by a cap or cover 52. Rechargeable batteries 54 and 56 are positioned in battery compartment 50. Batteries 54 and 56 are electrically connected to an external switch 58 mounted on handle 44 in conventional fashion. Switch 58 is electrically connected to a reversible DC motor 60 in conventional fashion by leads as seen in FIG. 5. The motor 60 may be a variable speed motor. Motor 60 is positioned in compartment 66 of handle 44 as seen in FIGS. 3 and 4 and includes an anti-rotation sprocket 62 which is received in an annular gear 64 to prevent the rotation of motor 60. The power shaft 68 of motor 60 is configured to slidably receive one end of a drive shaft 70 having one end thereof connected to an elongated threaded screw member 72.

The motor compartment 66 is selectively closed by a cover 74. The inside surface of cover 74 has a semi-circular channel 76 which is configured to receive a portion of member 62 when cover 74 is in its closed position. The inside surface of cover 74 has a plurality of spaced-apart teeth 78 projecting inwardly therefrom which are configured to mesh with the notches 32 as will be described hereinafter. The inner surface of motor compartment 66 also has a plurality of spaced-apart teeth 78 formed therein which are a continuation of the teeth 78 in cover 74.

The inner surface of cover 74 is also provided with a semi-circular channel 80 formed therein which is designed to receive the periphery of an electrical collector ring 82 which is fixedly received in a semi-circular groove or channel 84 formed in the inside surface of handle 44.

Controller switch 58 is electrically connected to collector ring 82 by leads 86, 88, 90 and 92. When collector ring 82 is in engagement with collector ring 38, electrical power is supplied to the limit switches 94 and 96 by leads 98, 100, 102 and 104 which extend from collector ring 38 through hub 28 and into the interior of pole member 12. Leads 98 and 100 are electrically connected to normally open limit switch 94 which is positioned in pole member 12 near the inner end thereof (FIGS. 8 and 9). Leads 102 and 104 are electrically connected to the normally closed limit switch 96 which is positioned in the interior of pole member 12 near the outer end thereof (FIGS. 10-11).

The elongated screw member 72 is positioned in the interior of pole member 18. Screw member 72 will be described as having a first end 106 and a second end 108. The drive shaft 70 is secured to the first end 106 of screw member 72 and a fitting 110 is secured to the second end 108 of screw member 72. Fitting 110 rotatably receives the end 108 of screw member 72. Fitting 110 is held in place by screw 112. Collar 114 is secured to pole member 18 at end 20 by screw 116. An internally threaded nut 118 is fixed to collar 114 by any convenient means such as adhesive, press-fit, etc.

The rotation of screw member 72 in one direction by motor 60 causes pole member 18 to be moved outwardly with respect to pole member 12 to increase the length of the extension pole 10. The rotation of screw member 72 in the opposite direction by motor 60 causes pole member 18 to be moved inwardly with respect to pole member 12 thereby decreasing the length of the extension pole 10. The extension and retraction of pole member 18 with respect to pole member 12 is accomplished without rotation of pole member 18 since nut 118 is fixed to collar 114 which is fixed to pole member 18 which is fixed against rotation with respect to pole member 12 by fitting 24.

As seen in FIG. 8, the limit switch 94 is normally closed so that motor 60 may continue to move the pole member 18 inwardly with respect to pole member 12. When the inner end of pole member 18 engages and opens limit switch 94 (FIG. 9), the motor 60 will be deactivated.

As seen in FIG. 10, the limit switch 96 will be closed during normal extension of pole member 18 from pole member 12. When the inner end of pole member 18 disengages from limit switch 96, switch 96 opens to deactivate motor 60 thereby limiting the outward movement of pole member 18 with respect to pole member 12.

In normal use, as depicted in FIG. 3, the U-shaped notches 32 of hub 29 receive the teeth 78 of handle 44 and cover 74 with the teeth 78 being held therein by spring 42.

In that same position, the collector rings 36 and 84 are in electrical contact with one another so that electrical power is supplied to limit switches 94 and 96. In that position, the pole members 12 and 18 cannot be rotated with respect to handle 44 and vice versa. In that position, switch 58 is in a convenient position for the user of the pole 10.

If the user desires to rotate the paint roller 28 into a different position or attitude, the user grasps the hub 29 and/or pole member 12 with one hand and grasps the handle 44 with his/her other hand. The user then pulls the handle 44 away from the hub 29, or vice versa, which causes the separation of the teeth 78 from the notches 32. The hub 29, with the pole member 12 attached thereto, is then rotated or indexed to the desired position with respect to the handle 44. When that position has been reached, the hub 29 and handle 44 are moved toward one another until the teeth 78 and notches 32 are again engaged. The paint roller 28, or other tool, on the end of pole member 18 is then in the proper position and the switch 58 is still in its original position so that it is still in a convenient location for the user.

Thus it can be seen that the invention accomplishes all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A motorized extension pole, comprising:
   a first elongated, hollow pole member, having first and second ends;
   a handle, having inner and outer ends, secured to said first end of said first pole member;
   a second elongated, hollow pole member, having first and second ends, telescopically mounted in said first pole member and which extends thereinto from said second end of said first pole member;
   said second end of said second pole member protruding from said second end of said first pole member;
   said second pole member being telescopically movable between retracted and extended positions with respect to said first pole member;
   a selectively reversible battery powered drive motor positioned in said handle member;
   a switch mounted on said handle member for controlling said drive motor;
   said drive motor having a power shaft extending therefrom towards said outer end of said handle member;
   an extension and retraction mechanism interconnecting said first and second pole members for selectively extending and retracting said second pole member with respect to said first pole member;
   a coupling mechanism operatively interconnecting said handle member and said first end of said first pole member which is configured to permit said first pole member to be selectively rotated about the longitudinal axis of said first pole member without rotating said handle member.

2. The motorized extension pole of claim 1 wherein said coupling mechanism includes a locking mechanism which locks said first pole member in various rotational positions relative to said handle member.

3. The motorized extension pole of claim 1 wherein a battery power source is positioned in said handle member for driving said drive motor.

4. The motorized extension pole of claim 1 wherein first and second limit switches are mounted on said first pole member for limiting the extension and retraction of said second pole member with respect to said first pole member and wherein said limit switches are operatively connected to said drive motor.

5. The motorized extension pole of claim 4 wherein an electrical circuit electrically connects said limit switches to said drive motor and wherein an electrical collector ring assembly is imposed in said electrical circuit.

6. The motorized extension pole of claim 1 including structure which prevents said second pole member from rotating with respect to said first pole member as it moves between its said retracted and extended positions.

7. The motorized extension pole of claim 1 wherein said drive motor is a variable speed drive motor.

8. The motorized extension pole of claim 1 wherein a threaded stud extends from said second end of said second pole member.

9. The motorized extension pole member of claim 8 wherein a paint roller is secured to said threaded stud.

10. The motorized extension pole member of claim 8 wherein a chainsaw is secured to said threaded stud.

11. The motorized extension pole member of claim 8 wherein a hedge trimmer is secured to said threaded stud.

12. The motorized extension pole member of claim 8 wherein a gutter cleaner is secured to said threaded stud.

* * * * *